(No Model.)
J. A. ROBERTS.
BELT FASTENER.
No. 298,120. Patented May 6, 1884.
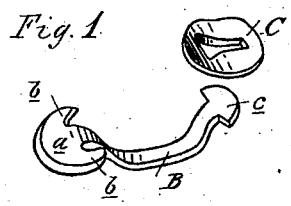
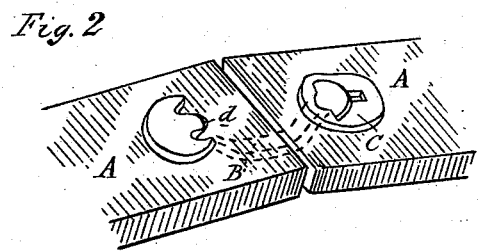
Attest
J. Paul Mayer
Inventor
James A. Roberts
By Thos. S. _____
Atty

UNITED STATES PATENT OFFICE.

JAMES A. ROBERTS, OF DETROIT, MICHIGAN, ASSIGNOR OF ONE-HALF TO WM. M. DWIGHT, OF SAME PLACE.

BELT-FASTENER.

SPECIFICATION forming part of Letters Patent No. 298,120, dated May 6, 1884.

Application filed March 12, 1884. (No model.)

*To all whom it may concern:*

Be it known that I, JAMES A. ROBERTS, of Detroit, in the county of Wayne and State of Michigan, have invented new and useful Improvements in Belt-Fasteners; and I do hereby declare that the following is a full, clear, and exact description thereof, reference being had to the accompanying drawings, which form a part of this specification.

This invention relates to certain new and useful improvements in the construction of belt-fasteners; and the invention consists in the peculiar construction and combination of the parts, all as more fully hereinafter set forth.

Figure 1 is a perspective view of my improved fastener. Fig. 2 is a similar view showing its application to a belt.

In the accompanying drawings, which form a part of this specification, A A represent two ends of a belt which it is desired to secure together. B is an arched bar, of any suitable metal, and at one end is formed integrally therewith an enlarged semicircular head, $a$, provided with the arms $b$. Upon the opposite end of the bar A is formed a T-head, $c$, with which engages a washer, C, when the device is in use.

In practice there are cut or punched in the ends of the belt, and in the direction of its length, slots $d$, more or less in number, according to the width of the belt, and through these slots the head $c$ is passed from the outside of the belt, after which the washer C is engaged with such head, as is fully shown in Fig. 2, the head $a$ and washer being flat upon the outside of the belting.

It will be observed that in this fastening there is provided a comparatively broad bearing-surface at each end of the bar, and that the strain is brought upon the outer face of the belt and not upon the outer end of the slit alone, thus materially lessening the liability of the fastening tearing out.

What I claim as my invention is—

A belt-fastener consisting of a bar, B, provided with an enlarged head, $a$, at one end, and a T-head, $c$, upon the opposite end, in combination with the washer C, when constructed, arranged, and operating substantially in the manner and for the purposes described.

JAMES A. ROBERTS.

Witnesses:
A. V. CARTER,
E. W. BENNETT.